United States Patent [19]

Ohmann

[11] Patent Number: 5,277,525
[45] Date of Patent: Jan. 11, 1994

[54] PULL BORING CUTTER HEAD

[76] Inventor: Jens Ohmann, House No. 9, Farm Steenkoppies, Magaliesburg, Transvaal Province, South Africa

[21] Appl. No.: 20,863

[22] Filed: Feb. 19, 1993

Related U.S. Application Data

[63] Continuation of Ser. No. 918,354, Jul. 23, 1992, abandoned.

[30] Foreign Application Priority Data

Jul. 26, 1991 [ZA] South Africa ............. 91/5881
Nov. 14, 1991 [ZA] South Africa ............. 91/9026

[51] Int. Cl.⁵ .............................................. B23B 51/00
[52] U.S. Cl. ........................................ 408/83; 408/227
[58] Field of Search .................... 408/80, 81, 83, 227, 408/199, 238

[56] References Cited

U.S. PATENT DOCUMENTS

| | | | |
|---|---|---|---|
| 1,954,034 | 4/1934 | Arp | 408/83 |
| 2,189,604 | 2/1940 | Healy | 408/83 |
| 2,661,639 | 12/1953 | Clyde . | |
| 3,348,434 | 10/1967 | Plummer | 408/83 |
| 4,571,129 | 2/1986 | Straud . | |

FOREIGN PATENT DOCUMENTS

| | | | |
|---|---|---|---|
| 173095 | 8/1965 | U.S.S.R. . | |
| 852458 | 8/1981 | U.S.S.R. | 408/227 |

*Primary Examiner*—Daniel W. Howell
*Attorney, Agent, or Firm*—Darby & Darby

[57] ABSTRACT

This invention concerns a pull boring cutter head assembly for machining long bores such as hydraulic cylinders and includes the use of support bearing blocks projecting from the cutter head to support the latter during cutting operations. The blocks are automatically radially adjustable under suitable biasing.

8 Claims, 2 Drawing Sheets

PULL BORING CUTTER HEAD

This is a continuation of application Ser. No. 07/918,354, filed Jul. 23, 1992 now abandoned.

INTRODUCTION

This invention relates to pull boring heads used in machining of bores in elongate tubular members. It is to be understood that wherever "pull boring" is referred to in this specification, that term is to be interpreted to included "push boring".

BACKGROUND OF THE INVENTION

Pull boring has been known for many years and consists essentially of pulling a rotating cutter head axially through a tubular member to machine cut the inner surface of the member. The members being machined are usually of considerable length. It is also usually desirable that the machining operation be done speedily and give a desired fine surface finish. Preferably the operation should be a single cut operation.

Members which are machined in this way are borehole linings and cylinders for hydraulic piston and cylinder assemblies.

The cutter heads generally used today comprise a body adapted to be coupled to the driving shaft and carrying a series of cutter tips. The cutting edges of the tips extend radially and are parallel to the direction of travel in use. The cutting tips extend rearwardly from the cutting edges parallel to the axis of the cutter head.

There are a plurality of cutting tips, usually three, equally spaced apart around the periphery of the cutting head. The outer edges of the cutting tips provide bearing surfaces for the rotating cutter head in the member which is being bored.

The pull boring heads described cannot be operated at high speed or under heavy cutting conditions essentially because of the very limited bearing surface provided by the cutter tips. Use results in wear of the cutter tips further resulting in loss of gauge of the machined bore and still further the cutting tips tend to chatter. This in turn results in a poor quality finish to the bore, and further to a short cutting tip lifetime.

It is the object of this invention to provide a cutter head for pull boring operations which is more satisfactory than those referred to above.

SUMMARY OF THE INVENTION

According to this invention there is provided a pull boring cutter head comprising a body having at least one cutter tip projecting from the periphery of the body and a plurality of radially expandable wedge shaped support blocks located in radially and longitudinally extending slots and co-operating with wedge shaped fingers projecting into the longitudinally extending slots from a rigid member axially movable relative to the body under a bias such that the support blocks project from the body behind the cutting tips in the direction of cutting.

Further features of this invention provide for there to be a multiplicity of cutting tips spaced around the periphery of the body, for the support blocks to be regularly interspersed between the cutting tips and for there to be a minimum of three cutting tips and support blocks.

The invention also provides for the bias to be provided by spring loading or pneumatic or hydraulic piston and cylinder assemblies.

Still further features of this invention provide for the blocks to be of a suitable wearable material such as nylon or that sold under the trade mark "TUFFENOL" for example, and for the spring loading when used to be provided by an assembly of disc springs or coil springing.

BRIEF DESCRIPTION OF THE DRAWINGS

These and other features of this invention will become apparent from the following description of a preferred example of the invention wherein reference is made to the accompanying drawings in which.

DETAILED DESCRIPTION OF THE DRAWINGS

Figure 1:
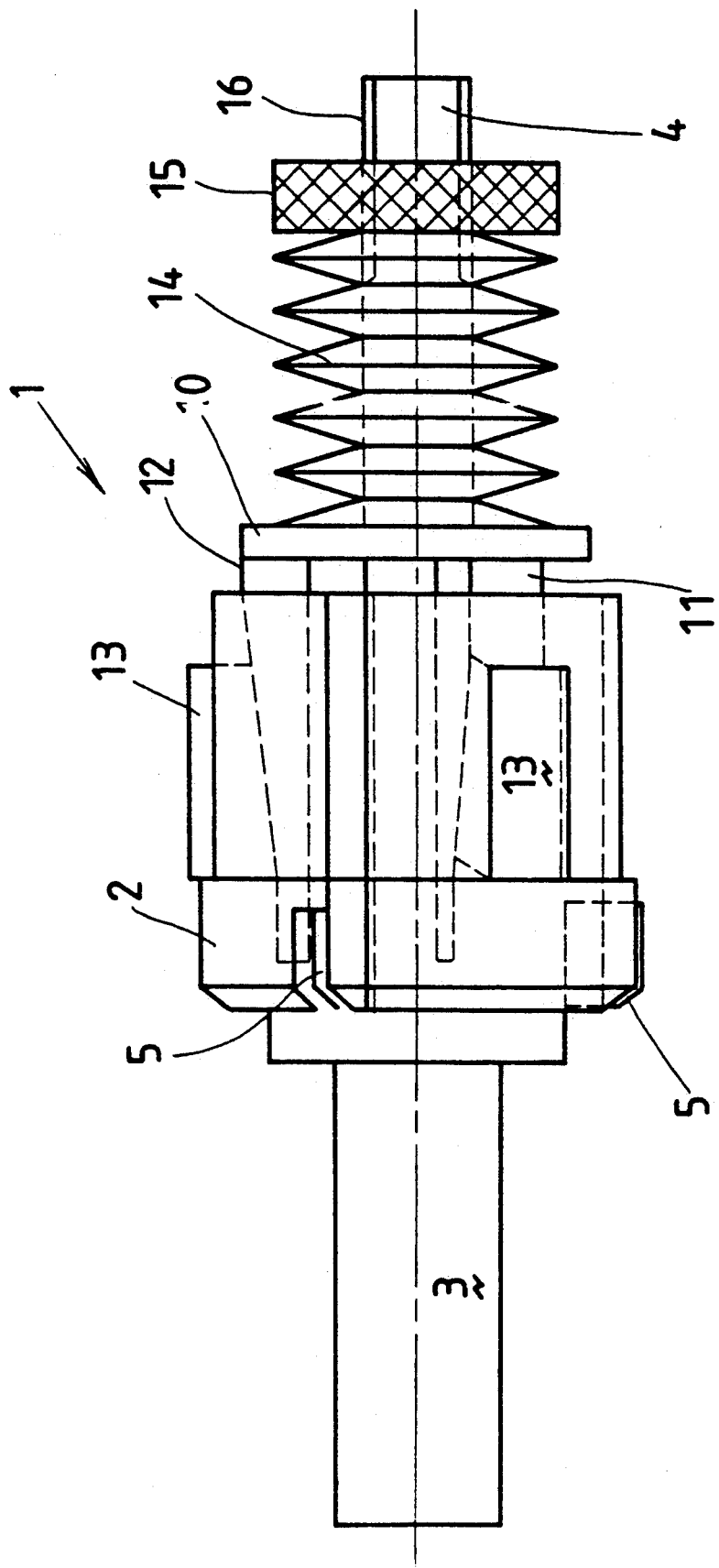
FIG. 1 is an elevation of the tool and FIG. 2 a similar view in section.
Figure 2:
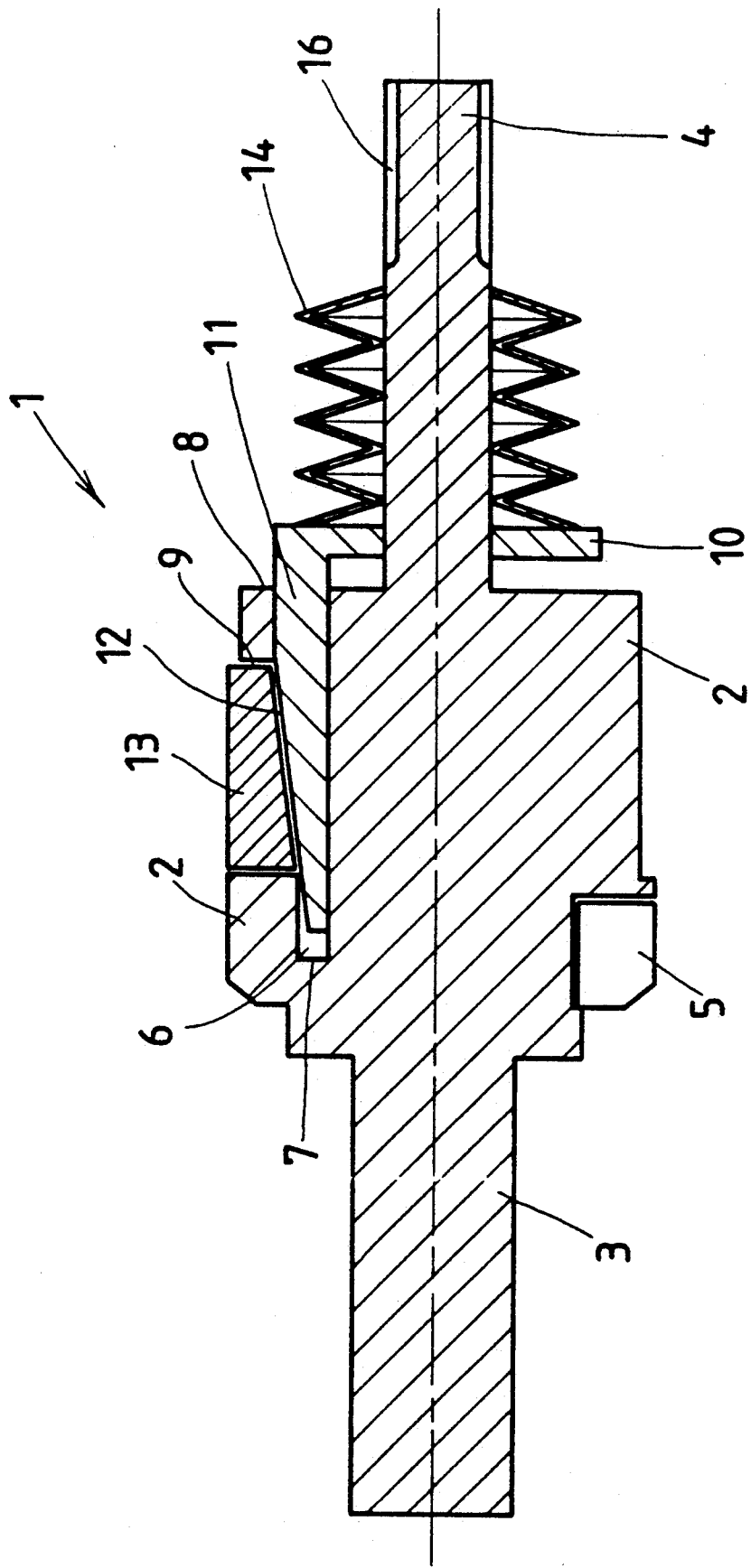

As illustrated a pull boring tool (1) has a body (2) with axially aligned stems (3) and (4) projecting from each end. The forward stem (3) is adapted to be attached to the drive assembly for pulling the tool through the bore which is to be machined.

The body has cutting tips (5) fitted to extend radially from the body (2) and spaced equally apart around the periphery of the body. There are in this example three cutter tips and their arrangement and mounting in the body (2) is in substantially conventional manner.

Behind the cutter tips (5) in the direction of cutting the body has had longitudinally extending slots or pockets (6) formed therein. The inner surface (7) of each slot (6) is parallel to the axis of the body (2) but the outer surface (8) is stepped outwardly and rearwardly so that the forward end of the outer surface (8) is of smaller diameter than the rearward end which opens outwardly from the body (2).

Radial slots (9) extend from the outer surface of the body (2) into the slot (6). These slots (6) and (9) are symmetrically interspersed circumferentially between the cutter tips (5).

On the rearwardly projecting stem (4) is mounted a collar (10) which has fingers (11) projecting forwardly from the periphery of the collar. The fingers (11) are shaped to engage in the slots (6) and have their inner surface complementary to the inner surface (7) of the slots (6).

The outer surface (12) of the fingers are tapered rearwardly and outwardly at an angle of about 7½ degrees. The thickness of the fingers is such that they may be moved into the slots (6) while the outer surfaces provides wedge-shapes into slots (6).

Support blocks (13) of wearing material such as "TUFFENOL" are fitted into slots (6) to project a small distance beyond the outer surface of the body (2). These blocks (13) have their outer surfaces shaped to conform approximately to the required bore that the tool is to be used to cut. This is not essential as the material of the blocks will wear to the desired shape during use.

Rearwardly of the collar (10) is an assembly of disc springs (14) on the stem (4). These are held on the stem by a nut (15) which engages on the screw thread (16) provided on the end of the stem (4). Rotation of the nut (15) causes the springs (14) to apply a bias to the collar (10) which tends to move forwardly along the stem (4).

Any such movement causes the fingers (11) to force the support blocks radially outwards.

In use the cutter body is set up for a boring operation in the usual way. However as the body enters the bore cut in the tubular member being machined the cutter body is supported in the bore by the support blocks (13). Adjustment of the nut (15) ensures firm contact between the blocks (13) and the machined bore. Wear of the support blocks (13) is taken up automatically by the outward pressure exerted on the blocks by the fingers (11) under the influence of the springs (14).

It has been been found that the cutter tool above described enables pull boring operations through long tubular members to be very satisfactorily effected. Heavy cuts have enabled finished bore size to be obtained with a single pass through the member. It has also been found that a satisfactory fine finish to the bored surface even for such articles as long hydraulic cylinders can be obtained without secondary cutting operations. Also it is not necessary to use expensive cutting oils with the tools. Ordinary water soluble oils have proved satisfactory.

The blocks (13) are inexpensive and simple to replace in the cutter body (2) as and when required.

It will be appreciated that the invention may be varied from the example above described. The number and arrangement of cutter tips and support blocks may differ as well as the material of the blocks.

Also the biasing of the blocks may be effected in different ways using, for example, pneumatic or hydraulic pressure on the collar.

The invention provides a simple and effective means for enabling pull or push boring operations to be conducted in an efficient manner.

What I claim as new and desire to secure by Letters Patent is:

1. A pull boring cutter head comprising a body having at least one cutter tip projecting from the periphery of the body and a plurality of radially expandable wedge-shaped support blocks located in radially and longitudinally extending slots in the body and co-operating with wedge-shaped fingers projecting into the longitudinally extending slots from a rigid member axially movable relative to the body and a bias means acting against the rigid member for causing the support blocks to project from the body behind the cutting tips in the direction of cutting.

2. A pull boring cutter head as claimed in claim 1 in which a multiplicity of cutting tips are spaced around the periphery of the body and the support blocks are regularly interspersed between the cutting tips.

3. A pull boring cutter head as claimed in claim 2 which includes three cutter tips and three support blocks.

4. A pull boring cutter head as claimed in claim 1 in which the biasing means is resilient and provided by springs or hydraulic or pneumatic means.

5. A pull boring cutter head as claimed in claim 4 in which the body has axially aligned stems projecting from each end of the body, one carrying the axially movable member and the other adapted to be connected to a drive assembly for the cutter head.

6. A pull bring cutter head as claimed in claim 4 in which the resilient biasing means comprises an assembly of disc springs.

7. A pull boring cutter head as claimed in claim 1 in which the support blocks have bearing surfaces shaped to conform at least approximately to the bore required to be machined by the cutter head.

8. A pull boring cutter head as claimed in claim 7 in which the support blocks are made from "TUFFENOL" material.

* * * * *